Patented Dec. 21, 1948

2,456,621

UNITED STATES PATENT OFFICE 2,456,621

METHOD OF EXTRUDING POLYTETRAFLUOROETHYLENE AND COATING ARTICLES THEREWITH

Azro Jack Cheney, Jr., Upper Montclair, N. J., assignor to E. I. du Pont de Nemours & Company, Wilmington, Del., a corporation of Delaware No Drawing. Application August 17, 1946, Serial No. 691,406

5 Claims. (Cl. 18—59)

This invention relates to a method of preparing polytetrafluoroethylene articles and more particularly to an extrusion method of preparing various articles from said polymer.

A method of preparing polytetrafluoroethylene is disclosed in U. S. Patent 2,230,654; it is a polymeric material highly resistant to corrosion and oxidation, and is exceedingly valuable for the manufacture into commercially useful articles.

Heretofore a number of useful articles have been fabricated of this polymer; however, the methods by which these articles were made have not been entirely satisfactory. One disadvantage of the prior art methods is that they are undesirably slow and costly and therefore not adapted to mass production. This is due primarily to the fact that conventional methods of extruding plastics are not applicable to polytetrafluoroethylene because of its unusual properties. Thus, polytetrafluoroethylene-insulated wires are conveniently produced by wrapping the wires with polytetrafluoroethylene tape.

An object of this invention is to provide a novel method of fabricating polytetrafluoroethylene articles having excellent properties. A further object is to provide a highly efficient method of fabricating useful polytetrafluoroethylene articles of high tensile strength and flexibility. A still further object is to provide a method of extruding polytetrafluoroethylene into such articles, e. g. as rods and tubes. Another object is to provide a method of extruding polytetrafluoroethylene as a coating on wire, said coating being uniform, continuous, flexible and tough. Other objects will be apparent from the description of the invention given hereinafter.

The above objects are accomplished according to the present invention by prebaking finely divided tetrafluoroethylene polymer at a temperature of 300° C.–500° C., passing this prebaked polymer through a die having an internal contour of substantially the size and shape of the desired finished article, and baking the polymer at a temperature above 327° C. until sintered while passing through the die. In extruding a coating of this polymer on objects such as wires and the like, the object to be coated is fed into an extruder and carried along the path of the extruding polymer by the tensional pull of the polymer thereon.

It is advantageous, although not essential, to heat the polymer before passing through the die. This preheating step, which materially shortens the time required for the entire operation by lessening the time involved in the baking step, may be accomplished in the extruder by conventional heating means at a temperature below 327° C. and preferably at a temperature of about 200° C.–300° C.

In practicing this invention, it is preferred to use a finely divided polytetrafluoroethylene powder which may be obtained conventionally by polymerization of tetrafluoroethylene in a violently agitated system, or by subjecting the polymer to a mechanical subdivision step. The particular method of obtaining the polymer in a finely divided form is not a part of the present invention.

The following examples illustrate specific embodiments of this invention. Diameters of the dies referred to are inside diameters unless otherwise specified.

EXAMPLE I

Extrusion of rods

Polytetrafluoroethylene powder, which had been prebaked for 30 minutes at 360° C., was introduced from a hopper into a space between the opening of a 0.375-inch diameter mild steel tubular die and a ram which on its forward stroke drove the powder into the die. The ram, mechanically actuated by conventional means, moved in a reciprocating manner. The 12-inch long baking zone of the die was maintained at 360° C. A product 0.315 inch in diameter was extruded at the rate of 3 feet per hour.

EXAMPLE II

Extrusion coating of wire

Polytetrafluoroethylene powder, prebaked for 30 minutes at 360° C., was fed into the apparatus of Example I and under the same conditions except that a 0.035 inch hole extended through the ram along its longitudinal axis. A 0.032 inch copper wire was fed through the hole in the ram and into the die. The wire was held by and moved with the polymer passing through the die. A polytetrafluoroethylene-coated wire 0.300 inch in diameter was extruded at the rate of 18 inches per hour.

EXAMPLE III

Extrusion of rods

Polytetrafluoroethylene powder, prebaked at 300° C. for 8 hours, was fed into a conventional screw stuffer to which was attached a 1-inch diameter tubular die having a baking zone 24 inches long which was maintained at a temperature of 380° C. A rod ⅞ inch in diameter was extruded at the rate of 3 feet per hour.

Example IV

*Extrusion of tubes*

Powdered polytetrafluoroethylene, made from the scrap of polytetrafluoroethylene articles previously fabricated by a process involving heating at a temperature above 327° C., was fed into the screw stuffer of Example III which extruded the powder into a die designed for the production of tubes. This die comprised a steel tube 1¾ inches inside diameter having a ⅜-inch diameter metal core suspended therein. The 18-inch long baking zone of the die was maintained at a temperature of 380° C. A polytetrafluoroethylene tube 1⅝ inches outside diameter by ⅜ inch inside diameter was extruded at the rate of 2 feet per hour.

Example V

*Extrusion of rods*

To the screw stuffer of Example III was attached a die comprising seven ½-inch diameter stainless steel tubes. Polytetrafluoroethylene powder, prebaked at 330° C. for one hour, was fed into the screw stuffer which extruded the powder into the die. The 18-inch long baking zone of the die was maintained at a temperature of 385° C. Mechanical brakes were applied to the ½-inch diameter rods which were extruded at the rate of 1.4 feet per hour.

Example VI

*Extrusion coating of wire*

Polytetrafluoroethylene powder, prebaked for 30 minutes at 360° C., was fed into the screw stuffer of Example III (to which a cross-head was attached) while maintaining the casing thereof at a temperature of 300° C., the purpose of the latter temperature being to preheat the polymer. The screw stuffer extruded the prebaked and preheated polymer into the cross-head and then into a 0.298-inch diameter tubular die. Into this die through said cross-head was introduced 7 strands of silver-plated copper wire which had been twisted together to form a 0.086-inch diameter stranded wire conductor. The cross-head and 18-inch long baking zone of the die were maintained at a temperature of 400° C. The extrusion rate of the 0.275-inch diameter coated conductor was 6 feet per hour.

Example VII

*Extrusion coating of wire*

A center hole 0.093 inch in diameter was drilled along the longitudinal axis of the screw stuffer of Example III. A tubular die 0.298 inch in diameter was attached to the screw stuffer in such manner that the die had a common axis with the screw. Polytetrafluoroethylene powder, prebaked for 30 minutes at 360° C., was fed into the screw stuffer. Stranded wire of the type used in Example VI was fed into the center hole in the screw until the wire reached the point at which the polymer was passing from the screw stuffer into the die, then the wire was carried through the die by the polymer. The 18-inch long baking zone of the die was maintained at a temperature of 480° C. The 0.275-inch diameter coated conductor was extruded at a rate of 12 feet per hour.

Example VIII

*Extrusion coating of wire*

Polytetrafluoroethylene powder, prebaked for 30 minutes at 360° C., was fed into the screw stuffer of Example VI while maintaining the casing thereof at a temperature of 300° C. The screw stuffer extruded the prebaked and preheated polymer into the cross-head and then into a tubular die. Stranded wire of the type used in Example VI was fed into the die and carried therethrough by the extruding polymer. The die was made up of two sections of different size tubes placed end to end. The section nearest the screw stuffer (baking zone) was 12 inches long and 0.302 inch in diameter, while the second section (a second baking zone) was 24 inches long and ½ inch in diameter. The first section was maintained at a temperature of 420° C. and the second section at 400° C. The 0.263-inch diameter product was extruded at the rate of 50 feet per hour.

It will be understood that the above examples are merely illustrative and that the invention broadly comprises prebaking finely divided tetrafluoroethylene polymer at a temperature of 300° C.–500° C., passing this prebaked polymer (and the object to be coated if a coating operation is involved) through a die having an internal contour of substantially the size and shape of the desired finished article, and baking the polymer while passing through the die at a temperature above 327° C. but not in excess of 500° C.

The dies referred to herein usually serve the dual purpose of dies and baking zones simultaneously, the polymer being baked while passing through the heated die. However, the baking zone may include more than one section having the same or different inside diameters and maintained at the same or different temperatures. In the event two or more sections of different diameters are employed, the smallest diameter section is normally placed nearest the extruder and serves as a die and baking zone, while the larger diameter sections serve primarily as baking zones. Example VIII illustrates one embodiment of this phase of the present invention.

The baking step is essentially a sintering operation, while sintering may or may not be accomplished in the prebaking step. To sinter the polytetrafluoroethylene the temperature must be raised above 327° C. There is no particular advantage however in exceeding a temperature of 500° C.; more often it is disadvantageous, and usually the sintering can be effected more satisfactorily at a considerably lower temperature. The heating operations involved in this invention may be accomplished by means of electric heaters, gas heaters, a liquid, e. g. hot oil, a molten metal or alloy, or a mixture of molten inorganic salts. Electric heaters are preferred especially for carrying out the baking step.

An essential feature of this invention is the prebaking step in the absence of which the polymer is not extrudable into articles of uniform density characterized by freedom from flaws. Although it is not known exactly what change the polymer undergoes in the prebaking step, the unexpected discovery has been made that this phase of the process definitely renders the polymer extrudable, thereby greatly advancing the art. The prebaking step, by which the polymer is subjected to a temperature of 300° C.–500° C. throughout, may be continuous with the other steps of the process or it may be accomplished otherwise with respect to time.

It has been found that although the powdered polytetrafluoroethylene may be extruded through the die by means of a ram moving in a reciprocating manner and forcing the powder directly into the die, a preferred method of accomplishing this is by means of a conventional screw stuffer. As the polytetrafluoroethylene powder is being extruded through the die, there is a tendency to form loosely compacted articles because of insufficient compacting pressure. This tendency is overcome by using a longer die or by applying a mechanical brake to the article being extruded after it leaves the die. Although this compacting pressure is not critical over a very wide range of pressure, e. g., about 50–10,000 pounds per square inch, it (particularly the minimum pressure) does have some bearing on the quality of articles produced. The upper pressure which may be employed is limited perhaps more by the strength of the apparatus used than any other factor. Further, the pressure employed will depend somewhat on the type of article being produced. A suitable pressure under the circumstances employed may be readily determined by those skilled in the art.

The process of the present invention is applicable both to polytetrafluoroethylene and to mixtures of polytetrafluoroethylene with other components such as finely divided copper, tin, iron, lead, brass, bronze, graphite, asbestos, silica, calcium chloride, calcium fluoride, sodium chloride, ammonium chloride, ammonium nitrate, titanium dioxide or the like. These materials are usually added in powder form although they may, in some cases, be mixed in the form of fibers with the polytetrafluoroethylene where that is more convenient.

The process is also applicable to copolymers of tetrafluoroethylene with other polymerizable compounds such as isobutylene or ethylene and particularly copolymers containing substantial amounts of tetrafluoroethylene although more convenient means may be available for fabricating articles from copolymers, especially those containing a relatively small proportion of tetrafluoroethylene.

A further application of the tubes and rods produced according to the instant invention is for making sheets by placing the articles in a lathe or sheeting machine and turning off a continuous sheet of material. The articles are well suited for this purpose because they are uniform in size and shape and because there is no waste due to flaws in them. Of course, they may be made in various sizes.

As will be apparent, semi-finished articles may be produced according to this invention and thereafter machined or otherwise treated to give the desired finished articles. Further, the finished articles of the instant invention may be made into more complex shapes or otherwise modified by machining or treating in other ways to give the desired finished articles.

An outstanding advantage of the present invention is that it provides a method of fabricating polytetrafluoroethylene articles (e. g. rods, tubes and coated objects such as wire and the like) economically and on a mass production scale far greater than anything heretofore attained. Furthermore, these articles possess excellent properties such as exceptional toughness and flexibility at a temperature as high as 300° C., uniformity in size and shape, and freedom from flow marks and flaws. Wire and other objects may be coated according to this invention with a uniform, continuous and tough coating of polytetrafluoroethylene that binds itself strongly to the object coated and is desirably non-adherent to other objects which it may touch. The invention is particularly well adapted to extruding such a polytetrafluoroethylene coating onto wire. In the case of wire coating, a highly flexible product composed of a wire concentrically surrounded by said polymer is formed which possesses exceptional insulating and other electrical properties over a wide range of adverse conditions.

Another advantage of this invention is that scrap polytetrafluoroethylene, resulting from articles produced by this or other methods in which temperatures above 327° C. but not in excess of 500° C. were employed, may be finely divided and used for making articles according to the present invention, thus providing a process for utilizing scrap polytetrafluoroethylene which was heretofore discarded.

As many apparently widely different embodiments of this invention may be made without departing from the spirit and scope thereof, it is to be understood that the invention is not limited to the specific embodiments thereof except as defined in the appended claims.

I claim:

1. The method of preparing polytetrafluoroethylene articles comprising prebaking finely divided tetrafluoroethylene polymer at a temperature of 300° C.–500° C., passing said prebaked polymer through a die having an internal contour of substantially the size and shape of the desired finished article, and baking said polymer, while passing through said die, at a temperature above 327° C. until sintered.

2. Method of preparing polytetrafluoroethylene articles comprising prebaking finely divided tetrafluoroethylene polymer at a temperature of 300° C.–500° C., passing said prebaked polymer through a die having an internal contour of substantially the size and shape of the desired finished article, and baking said polymer, while passing through said die, at a temperature above 327° C. but not in excess of 500° C. until sintered.

3. Method of preparing polytetrafluoroethylene articles comprising prebaking finely divided tetrafluoroethylene polymer at a temperature of 300° C.–500° C., introducing said prebaked polymer at a temperature of 200° C.–300° C. into a die having an internal contour of substantially the size and shape of the desired finished article, and passing said polymer through said die while simultaneously baking said polymer at a temperature above 327° C. but not in excess of 500° C. until sintered.

4. Method of coating objects with polytetrafluoroethylene comprising prebaking finely divided tetrafluoroethylene polymer at a temperature of 300°–500° C., simultaneously passing said prebaked polymer and an object to be coated through a die having an internal contour of substantially the size and shape of the desired finished article, and baking said polymer, while passing through said die, at a temperature above 327° C. until sintered, thereby extruding the polymer from the die as a uniform, continuous and flexible coating on said object.

5. Method of coating wire with polytetrafluoroethylene comprising prebaking finely divided tetrafluoroethylene polymer at a temperature of 300° C.–500° C., introducing substantially simultaneously said prebaked polymer at a temperature of 200° C.–300° C. and said wire into a die having an internal contour of substantially the size and shape of the desired finished article, and passing said polymer and wire through said die while simultaneously baking said polymer at a temperature above 327° C. but not in excess of 500° C. until sintered, thereby extruding the polymer from the die as a uniform, continuous and flexible coating concentrically surrounding said wire.

AZRO JACK CHENEY, JR.

REFERENCES CITED

The following references are of record in the file of this patent:

UNITED STATES PATENTS

| Number | Name | Date |
|---|---|---|
| 2,396,629 | Alfthan et al. | Mar. 19, 1946 |
| 2,400,099 | Brubaker et al. | May 14, 1946 |
| 2,413,498 | Hill | Dec. 31, 1946 |

OTHER REFERENCES

Yelton "Teflon" Plastics and Resins, May 1946, pp. 14–16 and 36.

Certificate of Correction

Patent No. 2,456,621. December 21, 1948.

AZRO JACK CHENEY, JR.

It is hereby certified that error appears in the printed specification of the above numbered patent requiring correction as follows:

Column 1, lines 20 and 21, for the word "conveniently" read *conventionally*; and that the said Letters Patent should be read with this correction therein that the same may conform to the record of the case in the Patent Office.

Signed and sealed this 12th day of April, A. D. 1949.

[SEAL]

THOMAS F. MURPHY,
*Assistant Commissioner of Patents.*